United States Patent [19]

Schuler et al.

[11] 4,396,646

[45] Aug. 2, 1983

[54] METHOD OF MAKING PATTERNED POLARIZERS

[75] Inventors: Norman W. Schuler, Hyde Park; Gary T. Scupp, Walpole, both of Mass.

[73] Assignee: Polaroid Corporation, Cambridge, Mass.

[21] Appl. No.: 285,273

[22] Filed: Jul. 20, 1981

[51] Int. Cl.$^3$ .......................... G02B 5/30; G02B 1/10
[52] U.S. Cl. ........................................ 427/163; 8/489
[58] Field of Search ............................. 427/163; 8/489

[56] References Cited

U.S. PATENT DOCUMENTS

| Re. 23,297 | 11/1950 | Hyman et al. | 350/398 |
| 2,237,567 | 4/1941 | Land | 350/397 |
| 2,454,514 | 11/1948 | Land | 213/12 |
| 3,015,989 | 1/1962 | Delangre et al. | 350/396 |
| 3,520,752 | 7/1970 | Dreyer | 156/234 |
| 3,545,998 | 12/1970 | Buzzell | 427/163 |
| 4,166,871 | 9/1979 | Schuler | 427/163 |

Primary Examiner—James R. Hoffman
Attorney, Agent, or Firm—Louis G. Xiarhos

[57] ABSTRACT

A method of making patterned polarizer elements having areas exhibiting different optical properties comprising removing the dichroic dye from selected areas of a linear, dichroic, light polarizer and restaining these selected areas with a different dichroic dye.

14 Claims, No Drawings

METHOD OF MAKING PATTERNED POLARIZERS

In methods of producing polarized light, an unpolarized beam of light is transformed into a polarized beam often by means of a polarizer device which eliminates the unwanted type of vibration. Linear polarizers, which are capable of producing a beam of linearly polarized light, generally owe their properties of selectively passing radiation vibrating along a given electromagnetic radiation vector and absorbing radiation vibrating along a second given electromagnetic radiation vector to the anisotropic nature of the transmitting medium. Dichroic polarizers are linear polarizer devices that have the property of selectively absorbing one of the two rectangular components of ordinary light. Light entering a dichroic medium encounters two different absorption coefficients, one low and one high. The emerging light vibrates predominantly in the direction of low absorption.

The development of synthetic polarizers has made possible the widespread utility of light polarizing elements for a variety of applications. Uses now have been devised, however, that require the employment, within a single display, of light polarizing elements with discrete areas having different optical properties. For example, electronic games, which are enjoying a significant current popularity, often employ multicolored liquid crystal displays. Such coloration is accomplished through the use of variously colored light polarizer elements which are an integral part of the display. Since synthetic polarizer material commonly is available only in uniformly colored sheets, a composite polarizer element must be assembled wherever a multicolored display is desired. Unfortunately, the assembly of such composites is time-consuming and expensive. To have a unitary light polarizer sheet having areas of different coloration would be a significant advantage.

Known methods of producing light polarizing materials include that of imbibing a dichroic substance, such as an iodine stain, into a polymeric film material of a type adapted to be stretched to provide therein a high degree of molecular orientation. The polymeric film material may, for example, be composed of a transparent, molecularly oriented, linear, high molecular weight, hydroxyl-containing vinyl polymer. The most widely used type of synthetic, indirect, linear, dichroic polarizer is the polyvinyl alcohol-iodine complex polarizer. It consists of linear polyiodide contained within a polyvinyl alcohol helix. By orienting the polyvinyl alcohol matrix unidirectionally, the transition moments of the absorbers are also so oriented and the material becomes visibly dichroic.

Polyvinyl alcohol film polarizers include a plastic support which may be any suitable isotropic material, and preferably cellulose acetate butyrate. The support gives the film dimensional stability and additionally serves as a cover or protective element. It must naturally be transparent.

The manufacture of iodine stained dichroic light polarizing elements, which involves stretching polyvinyl alcohol and subsequently dyeing the material with a dichroic stain containing iodine, is well known and is disclosed, for example, in U.S. Pat. No. 2,237,567 issued to Edwin H. Land on Apr. 8, 1941. In accordance with that patent, it is disclosed that a cast sheet or film of polyvinyl alcohol (PVA) is first formed from an aqueous solution of the material. The dried cast sheet is then heated to a temperature at which it can be extended by stretching, preferably in a moist atmosphere. It is further disclosed in that patent that the stretched sheet may be bonded to a supporting sheet, as has been discussed above. After the stretched sheet is cooled, a dichroic stain may be applied to one or both surfaces of the sheet.

A major improvement in the above light polarizing element is explained in U.S. Reissue Pat. No. 23,297 issued on Nov. 28, 1950 to Mark Hyman, Jr. et al. That improvement is a protective surface layer on the iodine-stained polyvinyl alcohol light polarizer. The surface layer comprises an ester of polyvinyl alcohol, the ester being of a polybasic acid or a derivative of such an acid, particularly an inorganic polybasic acid, and more particularly boric acid, thereby providing a hybrid form of a polyvinyl alcohol-polyvinyl borate. This borating step is shown to provide greatly improved stability to the light polarizer not only against heat but also against moisture and ultraviolet radiation. It is accomplished by treating the stained polarizing element with a boric acid solution. Specifically the ester formed on the surface of the light polarizer is believed to be polyvinyl orthoborate.

In standard procedures for making the synthetic polarizer sheet described above, a dichroic dye is applied to the entire surface of the stretched PVA by spraying or immersion techniques. To impart different stains to a single sheet of oriented PVA introduces a considerable problem of color contamination of adjoining pattern areas. It is difficult to confine the dye materials to selected areas of the PVA sheet.

Using an alternative approach to effect varied coloration in a unitary synthetic polarizer sheet, an iodine-stained, stretched PVA light polarizer, as described above, can be bleached to remove the dichroic dye from the PVA sheet. However, the problem of confining the bleaching as well as the restaining activities to specific selected areas is further aggravated by a reduced affinity for dye by the bleached PVA material. Restaining produces a polarizer having an undesirably lower optical density than that of the unbleached polarizer sheet.

Now, according to the present invention, a method has been discovered for making unitary patterned polarizer elements, having areas exhibiting different optical properties, comprising selectively removing the dichroic dye from specific areas of a polyvinyl alcohol-iodine dichroic polarizer and restaining these areas with a different dichroic dye.

The polyvinyl alcohol (PVA) sheet employed in producing the light polarizing element of the present invention generally is prepared by unidirectionally stretching a sheet of PVA having a thickness ranging from about 0.038 to about 0.051 mm to between about 3.5 to about 4 times its normal dimensions. This stretching can be performed using common techniques widely known in the art. After the PVA sheet has been stretched and its polymeric molecules have become oriented, however, the sheet assumes a somewhat fibrous nature and its tensile strength in the direction transverse to the direction of stretch is significantly diminished. Accordingly, the stretched PVA sheet commonly is bonded to a sheet of supporting material. This supporting material preferably is a sheet of a cellulosic compound, such as, for example, cellulose acetate butyrate, cellulose acetate or cellulose triacetate. Further details regarding the PVA sheet and its support are disclosed in U.S. Pat. No. 3,097,106.

Once it has been uniaxially stretched, and preferably bonded to a supporting sheet, the polyvinyl alcohol sheet is then stained with an iodine solution to impart its dichroic properties. Prior to the sheet being subjected to boration, a masking material is applied to selective areas of the stained PVA sheet. The selectively masked sheet then is bleached to remove the iodine stain from the unmasked areas of the sheet. A second dichroic dye then is applied to the PVA sheet in order to restain the bleached areas. Following the restaining procedure, the masking material is removed from the sheet and the entire sheet is subjected to boric acid treatment to stabilize the light polarizer.

It has been found to be critical to perform the bleaching operation on the iodine-stained PVA sheet prior to borating the sheet. A borating sheet can be satisfactorily bleached to remove the iodine stain, but the resulting bleached PVA is difficult to restain. Restained areas do not exhibit the degree of optical density needed for practical utility. Density is markedly reduced from that of the original iodine-stained material and, accordingly, the restained areas do not favorably contrast with the unbleached areas. However, by bleaching the iodine-stained PVA sheet prior to boration, the bleached sheet is significantly more receptive to the second stain.

It additionally has been found that supplemental methods can be employed to further enhance stain-receptivity of the bleached sheet. One such method involves prestaining treatment of the oriented PVA sheet with an aqueous caustic solution containing methanol. The inclusion of methanol has been found to achieve improved dye density results. While concentrations and process conditions are not critical, an effective pretreatment solution contains about 5 to about 25 percent by weight sodium hydroxide and about 10 to about 50 percent by weight methanol. A preferred treatment uses an aqueous solution comprising about 16 percent sodium hydroxide and about 28 percent methanol applied at a temperature of about 51° C. with a solution contact time of about 15 seconds. Immersion or floating of the supported sheet over a bath of the caustic/methanol solution is a convenient mode of application. Variation in the component concentrations dictates alterations in the process temperature and contact time in order to obtain optimum conditions.

An alternate method of enhancing the dye-receptivity of the PVA sheet is to incorporate mordanting compounds into the PVA material. These materials conveniently can be included in the PVA solution used to cast the original PVA sheet which subsequently is uniaxially stretched and stained. Such mordants include, for example, p-dimethyl-ammoniumbenzaldehyde-p-toluene sulfonate, benzaldehyde-4-trimethyl ammonium iodide, and pyridine methyl-p-toluene sulfonate. Typically, about 2 mole percent of mordanting compound, based on the weight of PVA, is included in the original PVA casting solution. Processing times and temperatures for subsequent staining and restaining steps generally may be reduced if a mordanted PVA sheet is used.

The iodine-stained PVA sheet can be selectively masked with any material effective in shielding the masked areas during the bleaching and restaining operations. Depending on the bleaching technique employed, the requisites of the mask material may vary. A protective stencil of an adhesive polyester material has been found to provide an effective and easily applicable mask. The adhesive film material can be cut to form a pattern of a desired configuration and then be applied to the iodine-stained PVA sheet to selectively mask the sheet. The exposed areas of the sheet are stripped of their stain during the bleaching operation while the masked areas retain the iodine stain.

Various bleaching techniques can be utilized in removing the stain from the iodine-stained PVA sheet. For example, solvents such as methanol or water, caustic solutions such as aqueous sodium hydroxide, and destructive irradiation such as ultraviolet light may be used to bleach the iodine-stained sheet. A preferred bleaching technique is to apply to the masked sheet a solution of sodium hydroxide at a concentration of about 1 to about 50 percent by weight sodium hydroxide at a temperature of about 25° to about 70° C. for about 1 to about 30 seconds contact time. Particularly preferred is a solution containing about 20 percent by weight sodium hydroxide, applied at a temperature of about 40° C. for about 10 seconds.

After the PVA sheet has been bleached, it is then stained with a second dichroic dye to restain the unmasked, bleached areas of the PVA sheet. Any dichroic dye may be used, depending on the particular coloration desired. Typical dichroic dyes include Fastusol Red 4, Primula Yellow 2RH, Diphenyl Brilliant Blue Supra I FF, Rouge Diazamine Luminere 7B, C.I. Acid Blue 168, C.I. Acid Red 182, and C.I. Acid Violet 75 (obtained commercially from Pylam Products Company, Inc., Queens Village, N.Y.). An extensive tabulation of dichroism data on organic dyes can be found in Zocher, H. and Jacoby, F. C. "Uber die Optische Anisotropic Selektiv Absorbie render Farbstoffe," Koloid-Chem. Beiheft, 24, 365, 1927. A staining solution comprising an aqueous solution containing about 1 to about 10 percent by weight of the dye is preferred; application of the dye solution at a temperature of about 25° to about 70° C. with a process time of about 5 to about 30 seconds has been found to be preferable.

Once the PVA sheet has been restained, the masking material is removed and the entire polarizer sheet, exhibiting a pattern of differently dyed areas, is borated. This may conveniently be done by passing the sheet into a concentrated boric acid solution. Details regarding this borating step can be found in U.S. Reissue Pat. No. 23,297, issued Nov. 28, 1950 to Hyman et al.

The following examples are provided to further illustrate the invention. It will be understood that the examples are intended to be illustrative and not limiting in nature.

EXAMPLE I

A sheet of polyvinyl alcohol, (PVA), having a thickness of about 1.5 mils was stretched linearly to about 3.6 times its original length, and this stretched sheet was bonded to a support sheet of cellulose acetate butyrate. The supported PVA sheet then was passed (floated), PVA side down, over a pretreatment solution consisting of 16% by weight sodium hydroxide, 28% by weight methyl alcohol, and 56% by weight water at a temperature of about 51° C.±2° C. Solution contact time with the sheet was about 15 seconds, followed by an ambient temperature water rinse. The pretreated PVA sheet then was passed over an iodine staining bath containing iodine, potassium iodide, and water in a weight ratio of 1/15.82/328. The iodine bath was held at a temperature of 35° C. and the residence time of the sheet was about 15 seconds. Excess iodine was wiped off and the stained sheet was dried at 94° C. for about 1 minute. After drying, the sheet was selectively masked in a uniform stripe pattern along the length of the sheet using a white polyester tape (obtained commercially from 3M Company under the designation "Type 810"). The masked sheet was passed over a bleaching solution containing 20% by weight sodium hydroxide in water at about 40° C. for 10 seconds, was rinsed with ambient temperature water, and then was passed over a 3% by weight aqueous red dichroic dye solution (obtained commercially from Pylam Products Company, Inc. under the designation "Rouge Diazamine Luminere 78") at 50° C. for 25 seconds, followed by an ambient temperature water rinse. Following removal of the polyester tape mask material, the sheet was passed over a borating composition consisting of potassium iodide, boric acid, zinc chloride, and water, in a ratio of 1.95/1.25/1/25.67 by weight. The temperature of the borating bath was about 74° C., and the residence time of the PVA sheet was about 25 to 30 seconds. The borating sheet was wiped off and then dried in a circulating air oven at about 94° C. for about 1 minute.

The visual transmission (the amount of light across the visible spectrum passing through a material) of the restained red areas of the polarizing sheet was measured (e.g., using a Cary 14 spectrophotometer) to be about 60 percent. The iodine-stained areas had a transmission of about 42 percent.

EXAMPLE II

Following the same general procedure as outlined in Example I, a two color striped pattern polarizer sheet was prepared. In this example, however, the pretreatment (aqueous NaOH-MeOH solution) step prior to iodine staining was omitted.

The visual transmission of the restained red areas of the polarizing sheet was measured to be about 65 percent. The iodine-stained areas had a transmission of about 42 percent.

COMPARATIVE EXAMPLE III

Following the same general procedure as outlined in Example I, a two color striped pattern polarizer sheet was prepared. In this comparison, however, the borating step was conducted prior to the bleaching and restaining steps, and the pretreatment step prior to iodine staining was omitted.

The visual transmission of the restained red areas of the polarizing sheet was measured to be about 71 percent. The iodine-stained areas had a transmission of about 42 percent.

COMPARATIVE EXAMPLE IV

Following the same general procedure as outlined in Example I, a two color striped pattern polarizer sheet was prepared. In this comparison, the borating step was performed prior to the bleaching and restaining steps, but, however, the dye-receptivity enhancing pretreatment step also was included as in Example I.

The visual transmission of the restained red areas of the polarizing sheet was measured to be about 65 percent. The iodine-stained areas had a transmission of about 42 percent.

While the invention has been particularly shown and described with reference to preferred embodiments thereof, it will be understood by those skilled in the art that various modifications in form and detail may be made therein without departing from the spirit and scope of the invention. For example, although two color patterns have been described and illustrated, multicolored patterns may readily be accomplished by various modifications of the described method such as by selective dye application to individual bleached areas or by mask manipulation to cover and uncover selective areas to be individually bleached and restained as desired. Patterns may assume any configuration, from simple stripes to checks to elaborate designs. Modification of a method of making conventional iodine stained synthetic polarizer sheets has been described in detail in the specification and examples above; however, the iodine stain need not be the initial stain applied in the present multicolor staining process. The sequence of staining may be reversed and/or any two or more dichroic dyes may be used. The initial dichroic dye applied will dictate the choice of a particular bleaching means most effective for its selective removal.

We claim:

1. A method for making linear, dichroic polarizers having areas with different optical properties comprising:
   uniaxially stretching a film of polymeric material;
   staining the stretched film with a first dichroic dye solution;
   selectively masking the stained polymeric film;
   bleaching the masked polymeric film to remove the first dichroic dye from the unmasked areas thereof;
   applying a second dichroic dye solution to the bleached areas of said polymeric film to restain said areas;
   removing the mask from the stained polymeric film; and
   treating the stained film with a borating solution.

2. The method of claim 1 wherein said polymeric material is a hydroxyl-containing vinyl polymer.

3. The method of claim 2 wherein said polymeric material is polyvinyl alcohol.

4. The method of claim 3 wherein the stained polyvinyl alcohol film is selectively masked with a polyester adhesive tape.

5. The method of claim 3 wherein the first dichroic dye solution comprises an iodine solution.

6. The method of claim 5 wherein a caustic solution is used to bleach the iodine stain from the polyvinyl alcohol film.

7. The method of claim 6 wherein said caustic solution is an aqueous solution containing about 1 to about 50 percent by weight sodium hydroxide applied at a temperature from about 25° C. to about 70° C. with a contact time of about 1 to about 30 seconds.

8. The method of claim 7 wherein said caustic solution comprises about 20 percent by weight sodium hydroxide applied at a temperature of about 40° C. with a contact time of about 10 second.

9. The method of claim 3 wherein said second dichroic dye is applied in an aqueous solution containing about 1 to about 10 percent by weight of the dye at a temperature ranging from about 25° C. to about 70° C. with a contact time from about about 5 to about 30 seconds.

10. The method of claim 3 including pretreating the uniaxially stretched polyvinyl alcohol film, prior to staining with the first dichroic dye, with an aqueous solution of sodium hydroxide and methanol in order to enhance the dye-receptivity of the polyvinyl alcohol film.

11. The method of claim 10 wherein the pretreatment solution comprises about 5 to about 25 percent by weight sodium hydroxide and about 10 to about 50 percent by weight methanol.

12. The method of claim 11 wherein said pretreatment solution comprises an aqueous solution containing about 16 percent sodium hydroxide and about 28 percent methanol and is applied at a temperature of about 51° C. with a contact time of about 15 seconds.

13. The method of claim 3 wherein said film of polyvinyl alcohol comprises a mordant-containing polyvinyl alcohol material.

14. The method of claim 3 comprising:
uniaxially stretching a film of polyvinyl alcohol;
treating the stretched film with an aqueous solution containing about 16 percent by weight sodium hydroxide and about 20 percent sodium hydroxide at a temperature of about 51° C. with a contact time of about 15 second;
staining the pretreated polyvinyl alcohol film with an iodine solution;
selectively masking the stained polyvinyl alcohol film with a polyester adhesive material;
bleaching the masked film with an aqueous solution containing about 20 percent by weight sodium hydroxide at a temperature of about 40° C. with a contact time of about 10 seconds;
applying a second staining solution to the bleached areas of the polyvinyl alcohol film;
removing the polyester mask from the stained film;
treating the unmasked film with a borating solution.

* * * * *